Figure 1:
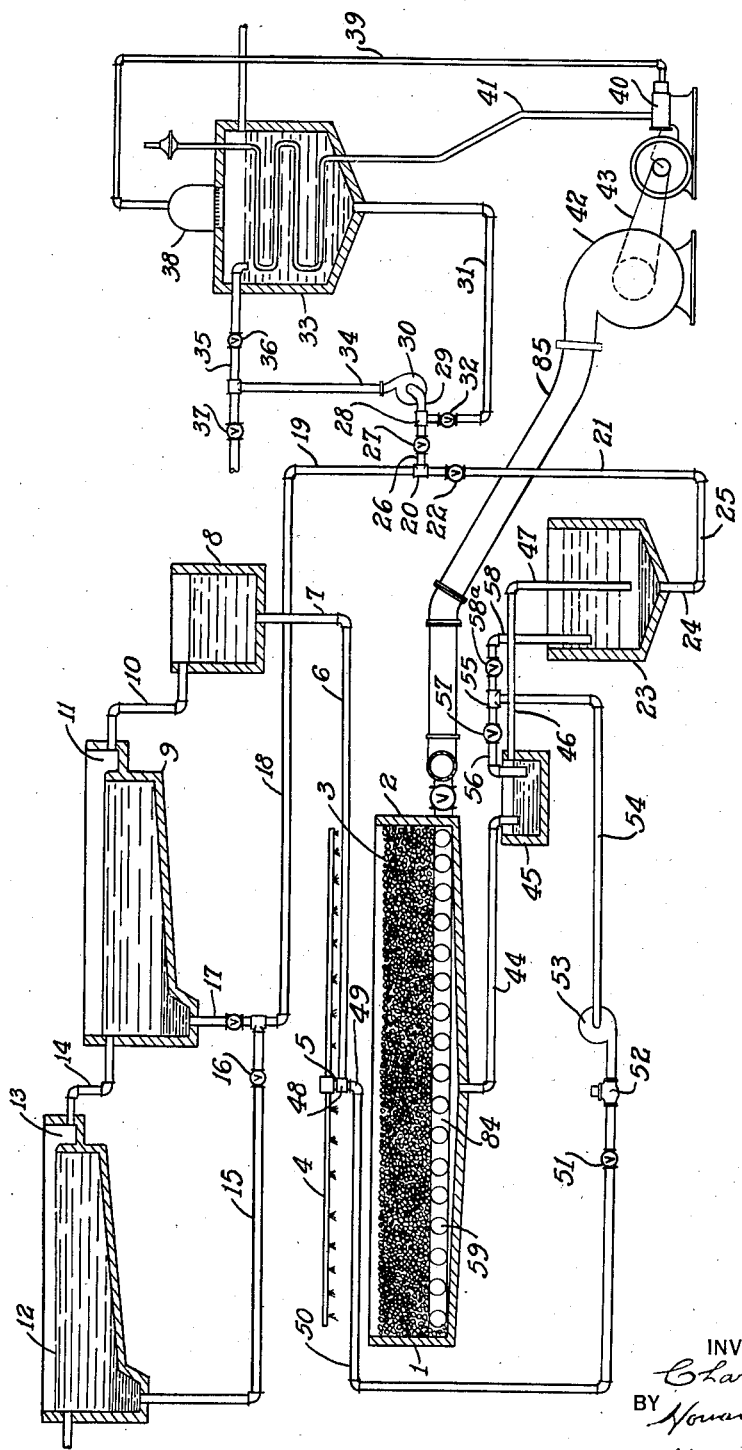

Aug. 17, 1937.　　　C. H. SHOOK　　　2,090,405
MEANS FOR PURIFYING POLLUTED LIQUIDS
Filed Nov. 1, 1935　　　2 Sheets-Sheet 1

INVENTOR,
Charles H. Shook,
BY Howard S. Smith,
His ATTORNEY

Aug. 17, 1937.   C. H. SHOOK   2,090,405
MEANS FOR PURIFYING POLLUTED LIQUIDS
Filed Nov. 1, 1935   2 Sheets-Sheet 2
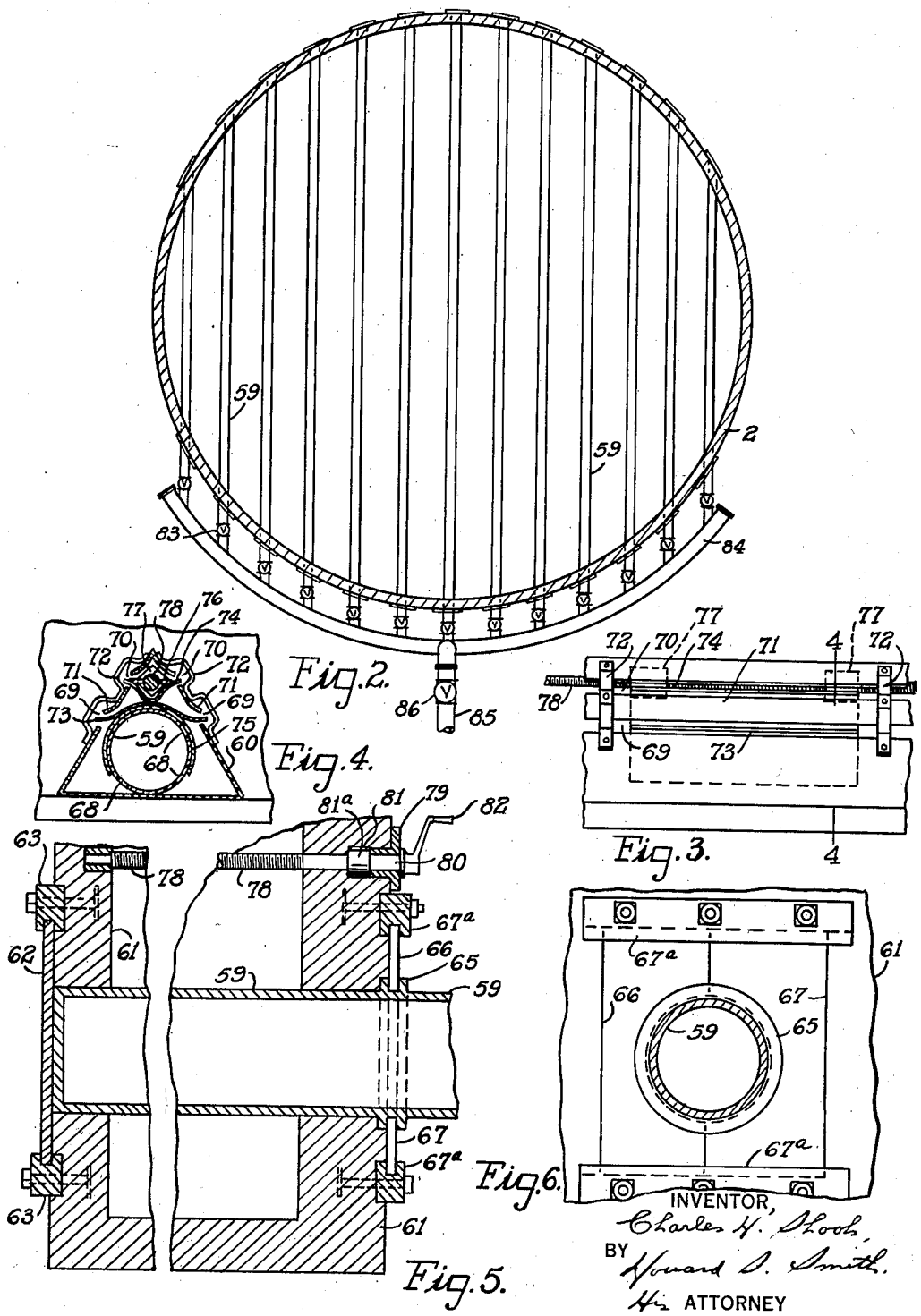

Patented Aug. 17, 1937

2,090,405

UNITED STATES PATENT OFFICE 2,090,405

MEANS FOR PURIFYING POLLUTED LIQUIDS

Charles H. Shook, Dayton, Ohio

Application November 1, 1935, Serial No. 47,827

5 Claims. (Cl. 210—7)

This invention relates to a new and useful process of, and means for, purifying polluted liquids.

Polluted liquids such as sewage are composed, among other things, of nitrogen-bearing compounds which must be oxidized to insure good purification.

There are three common methods of biologically oxidizing the nitrogen compounds in polluted liquids; the oldest, and now practically abandoned, system of intermittent sand filtration; trickling filters; and the activated sludge method. Sand filters are very large and oxidation rates are slow. Trickling filters as commonly used are smaller than the intermittent sand filters, and allow a much higher rate of sewage application. The activated sludge system is temperamental in its behavior, and expensive in construction and operation.

While this invention relates to the circulation of air through the filtering media to increase the efficiency of oxidizing agents, whether the filter be back of a chemical plant, or any other type of plant, or be the sole unit of a system, it is particularly concerned with the circulation of air through a trickling filter that is back of a chemical plant.

Since the efficiency of oxidation is dependent upon the quantity of available oxygen present, and since air contains more free oxygen than water, it is evident that a higher rate of oxidation may be had by circulating air through the filter. Furthermore, the circulating air is of much value in relieving the filter of carbon dioxide.

Among other things, the removal of suspended and colloidal organic material prior to filtration, decreases the load upon the filter. By removing this material first, there is actually less work for the filter to do, and consequently it can be smaller per gallon of liquid treated. Also, if these organic solids are prevented from being deposited in the top layer of the filter, less danger from clogging and consequently better air circulation through the filter will result.

Organic material in solution is immediately available for oxidation by the filter, whereas solid material can digest on the outer surface only. It is well known that a cake of ice disintegrates much faster when broken into small pieces than if it were left in a large cake. So it is with solids on a filter. The smaller the particles, the more rapid the digestion. Consequently, if only the soluble solids are discharged to the filter, its efficiency should be increased.

To insure the highest efficiency in a system under which the filter is placed back of a chemical plant, the pH value of the discharge to the filter must be controlled, and for the best results, maintained relatively constant. Such values range on each side of 7 as a neutral point. Specifically, pure water has a tendency to break down into positively and negatively charged ions. Those positively charged are the hydrogen ions, and those negatively charged are the hydroxyl ions.

Pure water is considered neutral, having each positive ion neutralized by a negative ion. It is possible to upset this equilibrium by the addition of a compound which breaks down, liberating more of one ion than the other. Thus if an acid is added, it has the effect of contributing hydrogen ions, while the addition of a base contributes hydroxyl ions. Based upon the actual weight of the hydrogen ion occurring, a numbering system to denote the amount of hydrogen ions existing in a solution, has been devised. As before stated, 7 is considered the neutral point, the acid range going from 7. to 0., and the alkaline range from 7. to 14. Measurement of the hydroxyl, or alkaline ion is recorded as diminished hydrogen ion. These figures are well known pH values.

The pH value may in some instances be determined by control of the volatile acids produced. It is found that bacteria are seriously affected by changes in pH and that the limits are relatively narrow. It is possible to accustom the bacteria to a pH value that is higher or lower than their normal point, but this must be done gradually. The fluctuations in pH that are found in normal sewage, therefore, are not conducive to the best filter action.

If chemical treatment, therefore, is applied to sewage ahead of trickling filter dosage, or any biologic treatment, the pH value of the discharge to the filter may be maintained relatively constant. Further, it can be maintained at a value that is particularly conducive to purifying action of the organisms present. This value, it has been found, is within the alkaline range, where the nitrifying bacteria are more effective. The nitrifying organisms are the ones which oxidize the nitrogen-bearing compounds of such polluted liquids as sewage, and, consequently, anything done to promote their activity, will be beneficial.

It is, therefore, one of the principal objects of this invention to first treat the liquid to be purified with chemicals, not only to settle out finely divided and colloidal material, but to maintain that liquid at a relatively uniform pH, after which the material remaining in the treated liquid is oxidized by biologic action. This oxidation rate may be increased by circulating air through a trickling filter, or through granular material, such as sand, etc.

If the human body can function more efficiently at certain uniform temperatures, so can the nitrifying bacteria be made more effective in oxidizing the nitrogen-bearing compounds of polluted liquids, such as sewage, at a uniform pH. Therefore, it is a particular object of this invention to control the pH of the liquid ahead of the filter dosage or other biologic action. The pH control may be maintained within the alkaline range in my system by the addition of lime, marl, waterwork's sludge, or other similar material to the liquid under treatment.

In the accompanying drawings illustrating my invention, Figure 1 is a schematic view, partly in section, of one form of apparatus for practicing my process. Figure 2 is a top plan view of the tubular aerating structure for the filter. Figure 3 is a side view of one of the louvered housings that may be provided for the aerating tubes. Figure 4 is a cross sectional view taken through one of these louvered housings, taken on the line 4—4 of Figure 3. Figure 5 is a longitudinal, sectional view taken through the trickling filter and an aerating tube therein, showing the door means for releasably holding the tube in the filter. And Figure 6 is an end view of one of the aerating tubes in the grip of one of the divided door plates.

Referring to the accompanying drawings for a detailed description of my process of purifying polluted liquids as practiced by the use of the apparatus therein disclosed, the numeral I designates a trickling filter that preferably comprises a tank 2 containing such substances as broken rocks 3 that present suitable surfaces for the adherence of growing bacterial slime or jelly.

In the present instance the liquid to be filtered is distributed upon the top of the filter bed 3 by a rotatable spray head 4 carried by a vertical riser 5. This riser projects upwardly from a T on one end of a horizontal inlet tube 6 that is attached to the lower end of a vertical pipe 7 which is connected to the bottom of a dosage tank 8.

The dosage tank 8 is in communication with a secondary settling tank 9 through a pipe line 10. The latter leads from a skimming gutter 11 in the upper portion of the tank 9 to the top of the dosage tank.

The polluted liquid is chemically treated by the addition of lime, marl, waterwork's sludge or similar material in a primary settling tank 12 to settle out much of the solid matter the liquid holds in suspension. Thence from a skimming gutter 13 in the upper portion of the tank 12, the chemically treated liquid flows through a pipe line 14 to the secondary settling tank 9.

Sludge which descends to the bottom of the primary settling tank 12 flows through a tubular line 15 carrying a valve 16 to a vertical tube 17 through which sludge also descends by gravity from the secondary settling tank 9 to a horizontal sludge line 18.

The combined sludge from the primary settling tank 12 and the secondary settling tank 9 flows through the sludge line 18 into the upper portion of a vertical tube 19 carrying a T 20 into which the top end of a vertical tube 21 carrying a valve 22, is fitted. The tube 21 receives sludge from the bottom of a humus tank 23 through a short vertical tube 24 and a connected horizontal tube 25.

Connected to the T 20 is one end of a horizontal tube 26 which carries a valve 27 and is fitted at its other end into a T 28 from which a horizontal tube 29 projects to a conventional sludge pump 30. Connected to the vertical part of the T 28 is a sludge line 31 carrying a valve 32 and running to the bottom of a sludge digestion tank 33.

From the sludge pump 30 a riser 34 projects to a horizontal sludge line 35 carrying valves 36 and 37, and connected at its inner end to the top part of the sludge digestion tank 33. Mounted upon the top of the latter is a gas collection dome 38 from which the digestor gases formed in the tank during the digestion of the sludge, are conducted by a gas line 39 to the intake of an internal combustion motor 40. Through a line 41 connected to the exhaust of this motor, exhaust gases from the latter pass through the sludge in the digestion tank 33, where the line is doubled, one part over another, to heat the sludge, thereby accelerating the digestion of it.

It is thus seen that I employ the digestor gases, rich in methane, generated in the digestion tank 33 for operating an internal combustion engine whose hot exhaust gases are employed to heat the sludge in that tank during its digestion. In the present instance this gas-propelled motor is employed to operate a conventional rotary fan 42, driving it through a belt 43, to force air to the filter I for a purpose later to be described.

By means of a single pump 30 sludge may be withdrawn from the humus tank 23 and the settling tanks 9 and 12, and forced to the digestion tank 33 when the valves 22, 27 and 36 are open and the valves 32 and 37 are closed. When the valves 22, 27 and 36 are closed, and the valves 32 and 37 are opened, the sludge pump 30 may be operated to force the digested sludge from the tank 33 through the open valves 32 and 37 to a sludge dryer not shown.

In the present instance the trickling filter I is placed behind a chemical plant. To insure complete efficiency in such a system the pH value of the discharge to the filter must be maintained at a relatively constant pH for the reasons heretofore given. This result is achieved in the present apparatus by the treatment of the liquid in the primary settling tank 12 with marl, lime, waterwork's sludge or similar material.

Free of solids which settle out of it in the primary settling tank 12, the liquid passes from the top of that tank to the secondary settling tank 9, where a further sedimentation takes place. In the remaining liquid, however, there is present such soluble compounds as sugar which cannot be removed by chemical treatment and deposition. This solution rises to the skimming gutter 11 in the tank 9, from which it flows to the bottom of the dosage tank 8 for a controlled delivery through the rotating spray head 4 to the top of the trickling filter I.

It being highly desirable that there be a recirculation of the filtered liquid to distribute more uniformly throughout the tank 2 the biologic growth which is found more prevalent in the lower part of the filter, and to inoculate the incoming liquid with these active organisms, I have employed the following apparatus for recirculating this filtered liquid. Connected to the sloping bottom of the tank 2 is one end of a discharge line 44, the other end projecting into a receptacle 45. Below this receptacle is the humus tank 23 into which the filtered liquid is adapted to flow from the former through a horizontal tube 46 and connected vertical tube 47.

The connected tubes 6 and 7 which conduct the treated liquid from the dosage tank 8 to the filter, also serve in the present apparatus to return the filtered liquid to the tank for recirculation through the filter. In order that the connected tubes 6 and 7 may serve this dual purpose, I provide the following means for periodically reversing the flow of liquid through them.

Connected to the lower end of the T 48 on the riser 5, by a bend 49, is a return line 50 carrying a valve 51 and meter 52, and connected to a centrifugal pump 53. Through a feed line 54 this pump is connected to a T 55. One side of this T is connected to a line 56, carrying a valve 57, that leads to the receptacle 45 from which filtered liquid is drawn by the pump 53 and forced through the line 50, and connected tubes 6 and 7, into the dosage tank 8. The other side of the T 55 is connected to one end of a line 58 carrying a valve 58a.

Through the line 58 which enters the humus tank 23, some of the solids from that tank may be drawn to the pump 53, and by the latter, forced to the dosage tank 8 with the filtered liquid taken from the receptacle 45.

The recirculation of this filtered liquid through the filter more uniformly distributes therein the bacterial slime or jelly which it has gathered in its previous descent therethrough. One part of the filter will therefore more nearly approach the efficiency of any other part in the process of oxidation.

For the purpose of circulating air through the filtering media in the tank 2, to increase the efficiency of the oxidizing agents, and relieve the filter of carbon dioxide, I have provided the following means, although I do not wish to be limited to the particular apparatus I have shown and described for accomplishing these results. Within the filter tank itself I have in the present instance inserted a plurality of apertured tubes 59. These tubes may be encased throughout their lengths in louver housings 60 that are substantially triangular in cross section. (See Figures 3 and 4.)

The rear end of each tube 59 is received by a hole in the filter wall 61 that is closed by a door plate 62 which is laterally slidable in grooved bracket members 63 firmly secured in recesses in the face of that wall. (See Figure 5.)

On its front end each tube 59 carries a fixed grooved collar 65 which the semicircular edges of the sections 66 and 67 of a divided gate plate are adapted to engage. The two sections 66 and 67 of each front gate plate are laterally slidable toward and away from each other in grooved bracket members 67a firmly secured in recesses in the filter wall. (See Figures 5 and 6.) By moving the two sections of its respective gate plate apart, a tube 59 may be easily drawn from the filter bed for cleaning and repair. These gates or closures are also provided to permit the filter media to be flooded at desired times.

For the purpose of discharging air into its louvered housing 60, each tube 59 is formed with apertures 68 in its circular wall. This air passes outwardly into the filter bed through the slots or openings 69 and 70 in the louvered housing 60 that are kept clear of clogging material by the following cutter device.

Referring to Figures 3 and 4, the louver slots 69 and 70 in each side of the housing 60 are defined by an intermediate member 71 that is supported by bands 72 attached to it and the upper and lower walls of the housing. The spaces left between the upper and lower edges of the member 72 and the adjacent edges of the walls of the housing, constitute, therefore, the louver slots 69 and 70.

Longitudinally slidable through the slots 69 and 70, for the purpose of clearing them when they become clogged, are cutter blades 73 and 74 carried by a semicircular yoke 75 slidable along each tube 59 within its respective louvered housing 60. The lower blade 73 conforms in contour at its middle portion to the yoke 75, to which it is secured, curving outwardly at its ends in a reverse direction for entrance into the slots 69, 69 in the sides of the housing. The upper cutter blade 74 is substantially U-shape at its central portion, where it is attached to the blade 73, flaring outwardly at its ends for entrance into the slots 70, 70 in the louver housing.

For the purpose of drawing the cutter unit just described longitudinally over its respective aerating tube 59, I have attached to a cross member 76 bridging the ends of the blade 74, nuts 77 which receive a screw shaft 78 that passes outwardly through a hole in the filter wall 61 and a bearing plate 79 attached to the latter. Fixedly attached to the outer end 80 of the screw shaft 78 within a recess 81 in the filter wall is a collar 81a. Fixedly secured to the extreme outer end of the screw shaft 78 is a crank 82 by which it may be rotated to move the cutter blades 73 and 74 longitudinally through the louver slots 69 and 70 to clear them of any material by which they are clogged, against the discharge of air into the filter bed.

Beyond the face of the filter wall 61, each tube 59, which carries a valve 83, is connected to a curved manifold 84. Communicating with the central portion of this manifold is one end of an air duct 85 carrying a shut-off valve 86. This duct is connected at its other end to the blower fan 42 which, when operated by the motor 40, will deliver to the filter bed a forced draft of air through which the liquid to be filtered will pass.

As stated before, this invention is not limited to a filter which in this instance is back of a chemical plant, since it may be placed back of any other type of plant, or it may be the sole unit of a system. In any use that may be made of my trickling filter, the circulation of air through the filter media by the above-described or similar means will actively aid the process of oxidation of the polluted liquids, and permit economies of construction and operation that are not possible with filters of the common type.

Having described my invention, I claim:

1. The combination with a tank containing a filter bed, of an apertured air tube insertible in said bed, a grooved collar on the outer end of said tube, brackets secured to the face of said tank adjacent said collar, and a pair of gate sections slidably supported by the brackets, and having semi-circular inner edges for movement into gripping engagement with the grooved collar on said tube to permit access to the filter bed.

2. The combination with a tank containing a filter bed for polluted liquids, of a conduit in said bed, having openings for the discharge of air therein, a sleeve member applied to, and longitudinally movable along said conduit and blades carried by the sleeve member to clear the openings in said conduit of clogging material.

3. The combination with a tank containing a filter bed, an elongated housing formed with louver slots in its sides, within said bed, an apertured air tube within said housing, a yoke member movable longitudinally along said tube within the housing, and cutter blades carried by said yoke for longitudinal movement through the louver slots to clear them of clogging material.

4. The combination with a tank containing a filter bed, of an air projector in said filter bed, a digester, a polluted liquid-receiving means in communication with said filter tank and the digester, means for removing sludge from said polluted liquid before it passes to the filter bed, a blower for supplying air under pressure to the air projector, an internal combustion motor for operating said blower, a dome in the upper portion of said digester for collecting gas generated therein, and a tube connecting said dome with the motor to operate the latter, and through it, the blower.

5. In a sludge digesting system, a settling tank in which sludge is settled from a polluted liquid, a digester, a sludge line leading from the settling tank to the digester, a sludge line for discharging digested sludge from the digester, and a single sludge pump connected to said lines for forcing sludge from the settling tank to the digester, and from the latter through the discharge line.

CHARLES H. SHOOK.